US010089606B2

(12) United States Patent
Ihm et al.

(10) Patent No.: US 10,089,606 B2
(45) Date of Patent: Oct. 2, 2018

(54) SYSTEM AND METHOD FOR TRUSTED MOBILE DEVICE PAYMENT

(75) Inventors: Nicholas Ihm, Brooklyn, NY (US); Christopher Guess, Brooklyn, NY (US); Micah Bergdale, Bronx, NY (US); Gregory Valyer, Highland Park, IL (US); Matthew Grasser, New York, NY (US)

(73) Assignee: Bytemark, Inc.

( * ) Notice: Subject to any disclaimer, the term of this patent is extended or adjusted under 35 U.S.C. 154(b) by 384 days.

(21) Appl. No.: 13/046,413

(22) Filed: Mar. 11, 2011

(65) Prior Publication Data

US 2012/0209630 A1  Aug. 16, 2012

Related U.S. Application Data

(60) Provisional application No. 61/442,138, filed on Feb. 11, 2011.

(51) Int. Cl.
*G06Q 40/00* (2012.01)
*G06Q 20/02* (2012.01)
*G06Q 20/32* (2012.01)

(52) U.S. Cl.
CPC ......... *G06Q 20/02* (2013.01); *G06Q 20/3274* (2013.01)

(58) Field of Classification Search
CPC .................................................... G06Q 20/206
USPC ............................................................ 705/42
See application file for complete search history.

(56) References Cited

U.S. PATENT DOCUMENTS

| 4,193,114 | A | 3/1980 | Benini |
| 5,253,166 | A | 10/1993 | Dettelbach |
| 5,465,084 | A | 11/1995 | Cottrell |
| 5,559,961 | A | 9/1996 | Blonder |
| 5,590,038 | A | 12/1996 | Pitroda |
| 5,621,797 | A | 4/1997 | Rosen |
| 5,777,305 | A | 7/1998 | Smith |
| 5,789,732 | A | 8/1998 | McMahon |
| 5,907,830 | A | 5/1999 | Engel |
| 5,918,909 | A | 7/1999 | Fiala |
| 6,023,679 | A | 2/2000 | Acebo |

(Continued)

FOREIGN PATENT DOCUMENTS

| EP | 1439495 A1 | 7/2004 |
| GB | 2390211 | 12/2003 |

(Continued)

OTHER PUBLICATIONS

Starnberger et al., "QR-TAN: Secure Mobile Transaction Authentication," area, pp. 578-583, 2009 International Conference on Availability, Reliability and Security, 2009.

(Continued)

*Primary Examiner* — Edward Chang
(74) *Attorney, Agent, or Firm* — Jennifer Meredith, Esq.; Meredith & Keyhani, PLLC

(57) ABSTRACT

This invention is related to secure payments using data codes displayed on a mobile device, for example a QR code displayed on a cell-phone. The invention establishes a third party transaction service that protects the customer's proprietary payment information, for example, credit card numbers, while ensuring for a merchant that a payment token, for example, the QR code, will represent a valid payment.

29 Claims, 5 Drawing Sheets

(56) References Cited

U.S. PATENT DOCUMENTS

| | | | |
|---|---|---|---|
| 6,023,688 A | 2/2000 | Ramachandran | |
| 6,085,976 A | 7/2000 | Sehr | |
| 6,175,922 B1 | 1/2001 | Wang | |
| 6,251,017 B1 | 6/2001 | Leason | |
| 6,315,195 B1 | 11/2001 | Ramachandran | |
| 6,373,587 B1 | 4/2002 | Sansone | |
| 6,393,305 B1 | 5/2002 | Ulvinen | |
| 6,454,174 B1 | 9/2002 | Sansone | |
| 6,473,739 B1 | 10/2002 | Showghi | |
| 6,484,182 B1 | 11/2002 | Dunphy | |
| 6,493,110 B1 | 12/2002 | Roberts | |
| 6,496,809 B1 | 12/2002 | Nakfoor | |
| 6,685,093 B2 | 2/2004 | Challa | |
| 6,775,539 B2 | 8/2004 | Deshpande | |
| 6,961,858 B2 | 11/2005 | Fransdonk | |
| 6,997,384 B2 * | 2/2006 | Hara | 235/454 |
| 7,017,806 B2 | 3/2006 | Peterson | |
| 7,020,635 B2 | 3/2006 | Hamilton | |
| 7,024,807 B2 | 4/2006 | Street | |
| 7,044,362 B2 | 5/2006 | Yu | |
| 7,080,049 B2 | 7/2006 | Truitt | |
| 7,090,128 B2 | 8/2006 | Farley | |
| 7,093,130 B1 | 8/2006 | Kobayashi et al. | |
| 7,103,572 B1 | 9/2006 | Kawaguchi | |
| 7,107,462 B2 | 9/2006 | Fransdonk | |
| 7,134,087 B2 | 11/2006 | Bushold | |
| 7,150,045 B2 | 12/2006 | Koelle | |
| 7,158,939 B2 | 1/2007 | Goldstein | |
| 7,174,462 B2 | 2/2007 | Pering | |
| 7,191,221 B2 | 3/2007 | Schatz | |
| 7,263,506 B2 | 8/2007 | Lee et al. | |
| 7,315,944 B2 | 1/2008 | Dutta | |
| 7,386,517 B1 | 6/2008 | Donner | |
| 7,392,226 B1 | 6/2008 | Sasaki | |
| 7,395,506 B2 | 7/2008 | Tan | |
| 7,493,261 B2 | 2/2009 | Chen | |
| 7,520,427 B2 | 4/2009 | Boyd | |
| 7,529,934 B2 | 5/2009 | Fujisawa | |
| 7,555,284 B2 | 6/2009 | Yan | |
| 7,567,910 B2 | 7/2009 | Hasegawa | |
| 7,587,502 B2 | 9/2009 | Crawford | |
| 7,617,975 B2 | 11/2009 | Wada | |
| 7,711,586 B2 | 5/2010 | Aggarwal | |
| 7,933,589 B1 | 4/2011 | Mamdani | |
| 7,967,211 B2 | 6/2011 | Challa | |
| 8,010,128 B2 | 8/2011 | Silverbrook | |
| 8,016,187 B2 | 9/2011 | Frantz | |
| 8,019,365 B2 | 9/2011 | Fisher | |
| 8,370,180 B2 | 2/2013 | Scott | |
| 8,379,874 B1 | 2/2013 | Simon | |
| 8,473,342 B1 | 6/2013 | Roberts | |
| 8,583,511 B2 | 11/2013 | Hendrickson | |
| 8,788,836 B1 | 7/2014 | Hernacki | |
| 2001/0005840 A1 | 6/2001 | Verkama | |
| 2001/0014870 A1 | 8/2001 | Saito | |
| 2001/0016825 A1 | 8/2001 | Pugliese | |
| 2001/0044324 A1 | 11/2001 | Carayiannis | |
| 2001/0051787 A1 * | 12/2001 | Haller et al. | 604/66 |
| 2001/0052545 A1 | 12/2001 | Serebrennikov | |
| 2001/0054111 A1 | 12/2001 | Lee | |
| 2002/0010603 A1 | 1/2002 | Doi | |
| 2002/0016929 A1 | 2/2002 | Harashima | |
| 2002/0023027 A1 | 2/2002 | Simonds | |
| 2002/0040308 A1 | 4/2002 | Hasegawa et al. | |
| 2002/0040346 A1 | 4/2002 | Kwan | |
| 2002/0060246 A1 | 5/2002 | Gobburu | |
| 2002/0065713 A1 | 5/2002 | Awada | |
| 2002/0065783 A1 | 5/2002 | Na et al. | |
| 2002/0090930 A1 | 7/2002 | Fujiwara | |
| 2002/0094090 A1 | 7/2002 | Iino | |
| 2002/0126780 A1 | 9/2002 | Oshima | |
| 2002/0138346 A1 | 9/2002 | Kodaka | |
| 2002/0145505 A1 | 10/2002 | Sata | |
| 2002/0184539 A1 | 12/2002 | Fukuda | |
| 2002/0196274 A1 | 12/2002 | Comfort | |
| 2003/0036929 A1 | 2/2003 | Vaughan | |
| 2003/0066883 A1 | 4/2003 | Yu | |
| 2003/0069763 A1 | 4/2003 | Gathman | |
| 2003/0069827 A1 | 4/2003 | Gathman | |
| 2003/0093695 A1 | 5/2003 | Dutta | |
| 2003/0105641 A1 | 6/2003 | Lewis | |
| 2003/0105954 A1 | 6/2003 | Immonen | |
| 2003/0105969 A1 | 6/2003 | Matsui | |
| 2003/0154169 A1 | 8/2003 | Yanai | |
| 2003/0163787 A1 | 8/2003 | Hay | |
| 2003/0172037 A1 | 9/2003 | Jung | |
| 2003/0200184 A1 * | 10/2003 | Dominguez et al. | 705/78 |
| 2003/0229790 A1 | 12/2003 | Russell | |
| 2003/0233276 A1 | 12/2003 | Pearlman | |
| 2004/0019564 A1 * | 1/2004 | Goldthwaite et al. | 705/44 |
| 2004/0019792 A1 | 1/2004 | Funamoto | |
| 2004/0030081 A1 | 2/2004 | Hegi | |
| 2004/0030091 A1 | 2/2004 | McCullough | |
| 2004/0030658 A1 | 2/2004 | Cruz | |
| 2004/0039635 A1 | 2/2004 | Linde | |
| 2004/0085351 A1 | 5/2004 | Tokkonen | |
| 2004/0101158 A1 | 5/2004 | Butler | |
| 2004/0111373 A1 | 6/2004 | Iga | |
| 2004/0128509 A1 | 7/2004 | Gehrmann | |
| 2004/0148253 A1 | 7/2004 | Shin | |
| 2004/0169589 A1 | 9/2004 | Lea | |
| 2004/0186884 A1 | 9/2004 | Dutordoir | |
| 2004/0210476 A1 | 10/2004 | Blair | |
| 2004/0224703 A1 | 11/2004 | Takaki | |
| 2004/0250138 A1 | 12/2004 | Schneider | |
| 2005/0059339 A1 | 3/2005 | Honda | |
| 2005/0060554 A1 | 3/2005 | ODonoghue | |
| 2005/0070257 A1 | 3/2005 | Saarinen et al. | |
| 2005/0108912 A1 | 5/2005 | Bekker | |
| 2005/0109838 A1 * | 5/2005 | Linlor | 235/380 |
| 2005/0111723 A1 | 5/2005 | Hannigan | |
| 2005/0116030 A1 | 6/2005 | Wada | |
| 2005/0204140 A1 | 9/2005 | Maruyama | |
| 2005/0212760 A1 | 9/2005 | Marvit | |
| 2005/0240589 A1 | 10/2005 | Altenhofen | |
| 2005/0252964 A1 | 11/2005 | Takaki | |
| 2005/0253817 A1 | 11/2005 | Rytivaara | |
| 2005/0272473 A1 | 12/2005 | Sheena | |
| 2006/0120607 A1 | 6/2006 | Lev | |
| 2006/0161446 A1 | 7/2006 | Fyfe | |
| 2006/0174339 A1 | 8/2006 | Tao | |
| 2006/0206724 A1 | 9/2006 | Schaufele | |
| 2006/0293929 A1 | 12/2006 | Wu | |
| 2007/0012765 A1 | 1/2007 | Trinquet | |
| 2007/0017979 A1 | 1/2007 | Wu | |
| 2007/0022058 A1 * | 1/2007 | Labrou et al. | 705/67 |
| 2007/0032225 A1 | 2/2007 | Konicek | |
| 2007/0136213 A1 | 6/2007 | Sansone | |
| 2007/0150842 A1 | 6/2007 | Chaudhri | |
| 2007/0156443 A1 | 7/2007 | Gurvey | |
| 2007/0192590 A1 | 8/2007 | Pomerantz et al. | |
| 2007/0215687 A1 * | 9/2007 | Waltman | G06Q 20/10 235/379 |
| 2007/0260543 A1 | 11/2007 | Chappuis | |
| 2007/0265891 A1 | 11/2007 | Guo | |
| 2007/0271455 A1 | 11/2007 | Nakano | |
| 2007/0273514 A1 | 11/2007 | Winand | |
| 2007/0276944 A1 | 11/2007 | Samovar | |
| 2007/0288319 A1 | 12/2007 | Robinson | |
| 2008/0007388 A1 | 1/2008 | Au | |
| 2008/0071587 A1 | 3/2008 | Granucci | |
| 2008/0071637 A1 | 3/2008 | Saarinen | |
| 2008/0120127 A1 | 5/2008 | Stoffelsma | |
| 2008/0120186 A1 | 5/2008 | Jokinen | |
| 2008/0154623 A1 | 6/2008 | Derker | |
| 2008/0191009 A1 | 8/2008 | Gressel | |
| 2008/0191909 A1 | 8/2008 | Mak | |
| 2008/0201212 A1 | 8/2008 | Hammad | |
| 2008/0201576 A1 | 8/2008 | Kitagawa | |
| 2008/0201769 A1 * | 8/2008 | Finn | 726/7 |
| 2008/0227518 A1 | 9/2008 | Wiltshire | |
| 2008/0263077 A1 | 10/2008 | Boston | |
| 2008/0288302 A1 | 11/2008 | Daouk | |
| 2008/0308638 A1 | 12/2008 | Hussey | |

(56) References Cited

U.S. PATENT DOCUMENTS

| | | |
|---|---|---|
| 2009/0055288 A1 | 2/2009 | Nassimi |
| 2009/0088077 A1 | 4/2009 | Brown |
| 2009/0125387 A1 | 5/2009 | Mak |
| 2009/0284482 A1 | 11/2009 | Chin |
| 2010/0017872 A1 | 1/2010 | Goertz |
| 2010/0044444 A1 | 2/2010 | Jain |
| 2010/0082491 A1 | 4/2010 | Rosenblatt |
| 2010/0121766 A1 | 5/2010 | Sugaya |
| 2010/0201536 A1 | 8/2010 | Robertson |
| 2010/0211452 A1* | 8/2010 | D'Angelo et al. ......... 705/14.38 |
| 2010/0219234 A1 | 9/2010 | Forbes |
| 2010/0228576 A1 | 9/2010 | Marti |
| 2010/0253470 A1 | 10/2010 | Burke |
| 2010/0268649 A1 | 10/2010 | Roos |
| 2010/0274691 A1 | 10/2010 | Hammad |
| 2010/0279610 A1 | 11/2010 | Bjorhn |
| 2010/0306718 A1 | 12/2010 | Shim |
| 2010/0308959 A1 | 12/2010 | Schorn |
| 2010/0322485 A1 | 12/2010 | Riddiford |
| 2011/0001603 A1 | 1/2011 | Willis |
| 2011/0040585 A1 | 2/2011 | Roxburgh et al. |
| 2011/0068165 A1 | 3/2011 | Dabosville |
| 2011/0078440 A1 | 3/2011 | Feng |
| 2011/0136472 A1 | 6/2011 | Rector |
| 2011/0153495 A1 | 6/2011 | Dixon |
| 2011/0251910 A1 | 10/2011 | Dimmick |
| 2011/0283241 A1 | 11/2011 | Miller |
| 2011/0307381 A1* | 12/2011 | Kim et al. ............... 705/44 |
| 2012/0006891 A1 | 1/2012 | Zhou |
| 2012/0030047 A1 | 2/2012 | Fuentes |
| 2012/0092190 A1 | 4/2012 | Stefik |
| 2012/0133484 A1 | 5/2012 | Griffin |
| 2012/0136698 A1 | 5/2012 | Kent |
| 2012/0166298 A1 | 6/2012 | Smith |
| 2013/0103200 A1 | 4/2013 | Tucker |
| 2013/0124236 A1 | 5/2013 | Chen |
| 2013/0194202 A1 | 8/2013 | Moberg |
| 2013/0204647 A1 | 8/2013 | Behun |
| 2013/0214906 A1 | 8/2013 | Wojak |
| 2013/0279757 A1 | 10/2013 | Kephart |
| 2014/0100896 A1 | 4/2014 | Du |
| 2014/0156318 A1 | 6/2014 | Behun |
| 2014/0186050 A1 | 7/2014 | Oshima |
| 2014/0279558 A1 | 9/2014 | Kadi |
| 2015/0084741 A1 | 3/2015 | Bergdale |
| 2015/0213660 A1 | 7/2015 | Bergdale |

FOREIGN PATENT DOCUMENTS

| | | |
|---|---|---|
| GB | 2417358 | 2/2006 |
| JP | 11145952 A | 5/1999 |
| JP | 2003187272 A | 7/2003 |
| TW | 200825968 A | 6/2008 |
| WO | 2007139348 A1 | 12/2007 |
| WO | 2008113355 | 9/2008 |
| WO | 2009141614 | 11/2009 |
| WO | 2011044899 | 4/2011 |
| WO | 2014043810 | 3/2014 |

OTHER PUBLICATIONS

Scott Boyter, "Aeritas tried to fill void until 3G wireless is ready; Mobile boarding pass is just one application being tested", all pages, Dallaw Forth Worth TechBiz, Feb. 19, 2001.

Joanna Elachi, "Lufthansa Debuts Barcode Check-in and Boarding", all pages, CommWeb.com, May 25, 2001.

"Aeritas launches secure wireless check-in with barcode", all pages, m-Travel.com, Nov. 9, 2001.

"Aeritas Launches Wireless Check-in and Security Service", all pages, MBusiness Daily, Nov. 8, 2001.

"New Fast Track Wireless Check-In and Security Solution", all pages, aerias.com, retrieved Feb. 5, 2002.

Hussin, W.H.; Coulton, P; Edwards, R., "Mobile ticketing system employing TrustZone technology" Jul. 11-13, 2005.

Jong-Sik Moon; Sun-Ho Lee; Im-Yeong Lee; Sang-Gu Byeon, "Authentication Protocol Using Authorization Ticket in Mobile Network Service Environment" Aug. 11-13, 2010.

Stephanie Bell, "UK Rail Network to Launch Mobile Train-Ticketing Application" Cardline, Feb. 4, 2011.

Ko Fujimura, Yoshiaki Nakajima, Jun Sekine: "XML Ticket: Generalized Digital Ticket Definition Language" Proceedings of the 3rd Usenix Workshop on Electronic Commerce, Sep. 3, 1998.

Chun-Te Chen; Te Chung Lu, "A mobile ticket validation by VSS teach with timestamp" Mar. 28-31, 2004.

Machine English translation of JP2003-187272A from U.S. Appl. No. 13/901,243.

Improvement of urban passenger transport ticketing systems by deploying intelligent transport systems, 2006.

\* cited by examiner

SYSTEM AND METHOD FOR TRUSTED MOBILE DEVICE PAYMENT

PRIORITY CLAIM

This application claims priority as a non-provisional continuation of U.S. Patent Application No. 61/442,138 filed on Feb. 11, 2011 which is herein incorporated by reference in its entirety.

FIELD OF INVENTION

This invention is related to secure payments using data codes displayed on a mobile device, for example a QR Code™ displayed on a cell-phone. The invention establishes a third party transaction service that protects the customer's proprietary payment information, for example, credit card numbers, while ensuring for a merchant that a payment token, for example, the QR code will represent a valid payment.

BACKGROUND

Fraudulent transactions executed on the Internet is a growing problem that will limit the adoption of automatic payment systems using a cell phone or other mobile device. The number of U.S. identity fraud victims rose 12 percent to 11.1 million adults last year, the highest level since the survey began in 2003, according to Javelin Strategy & Research, "Identity Fraud Survey Report," February 2010). However, the total annual fraud amount jumped just 7 percent to $48 billion. The report said this is because "consumers and businesses are detecting and resolving fraud more quickly" according to Javelin Strategy & Research, February 2009 study.

This invention is directed to setting up a trusted third party that the mobile device using retail customer and a merchant can both rely on to protect the credit card or other private payment information of the mobile device using customer and to ensure that the merchant is going to be paid for the transaction. It requires a relatively low investment in hardware and little modification of existing consumer habits. People are most likely to easily adopt new products or services (such as new ways to pay) if they don't have to significantly modify their behavior to take advantage of them. This invention is considerably simpler than the hardware requirements for the near field communications-based ISIS tap-to-pay system being developed by a coalition of major U.S. wireless carriers.

DETAILED DESCRIPTION OF THE PREFERRED EMBODIMENTS

The typical embodiment of the system is centered around a data object that can be displayed on the retail customer's mobile device. A mobile device can be a cell phone or other portable computer. The data object can be an image representing a 3 dimensional data object, or a 2 dimensional image encoding data like a QR code, PDF417, Data matrix or Maxi Code, a 1 dimensional image encoding data, for example, a bar-code, or even a set of alpha-numeric values or any other kind of image that can display data that can be captured by a merchant's point of sale (POS) device. The transaction service delivers the data object to the customer's mobile device such that each data object is preferably a token unique to the specific transaction. Use of QR codes for mobile devices is described in U.S. Pat. No. 6,997,384 Method for Displaying and Reading Information Code for Commercial Transaction, which is hereby incorporated by reference. In this invention, the trusted third party, which is the transaction service provider, manages the use of the data object so that both the retail customer and the merchant are protected from on-line fraud.

Figure 1:
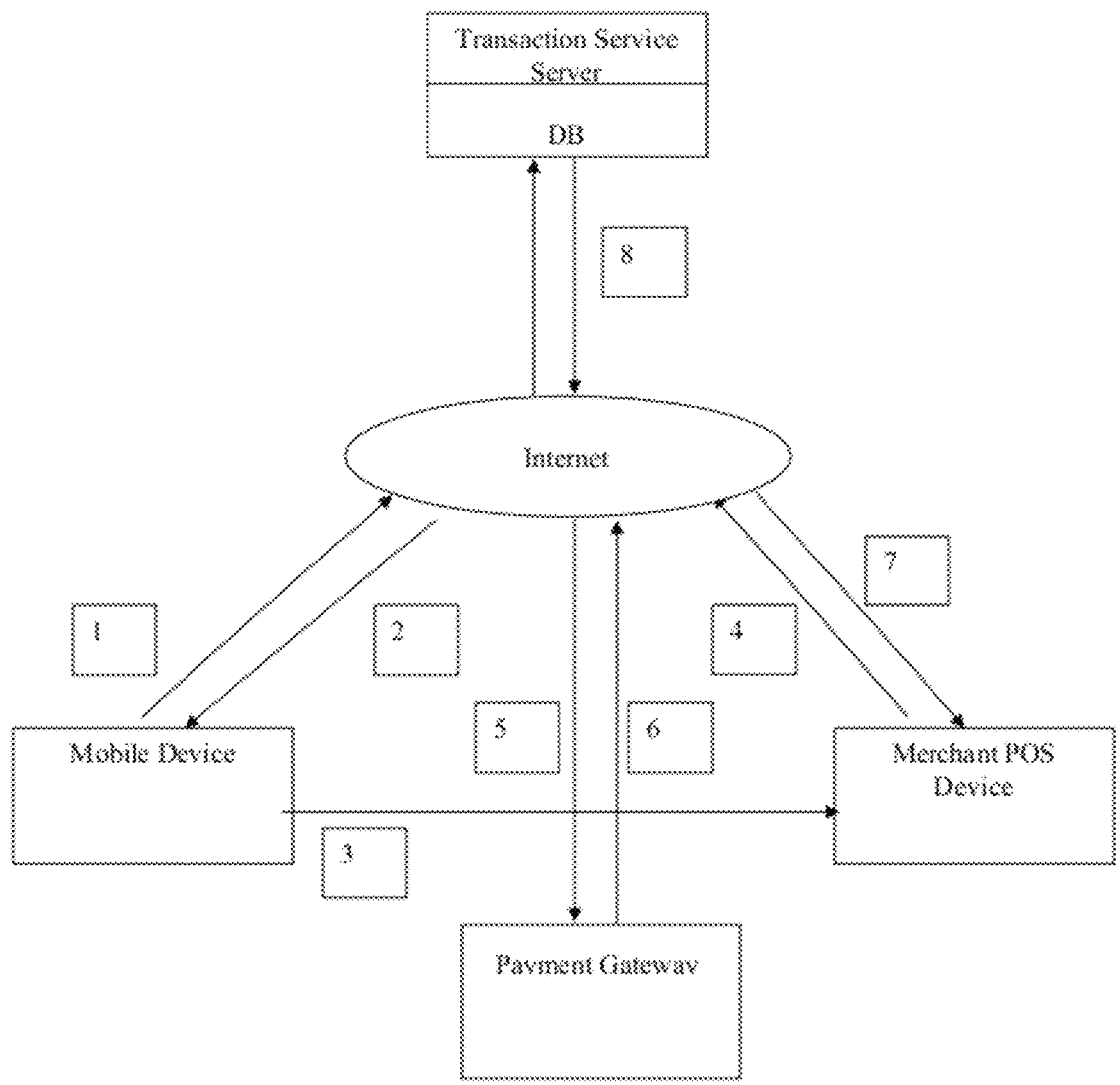
FIG. 1. Schematic of basic system architecture.
Figure 2:
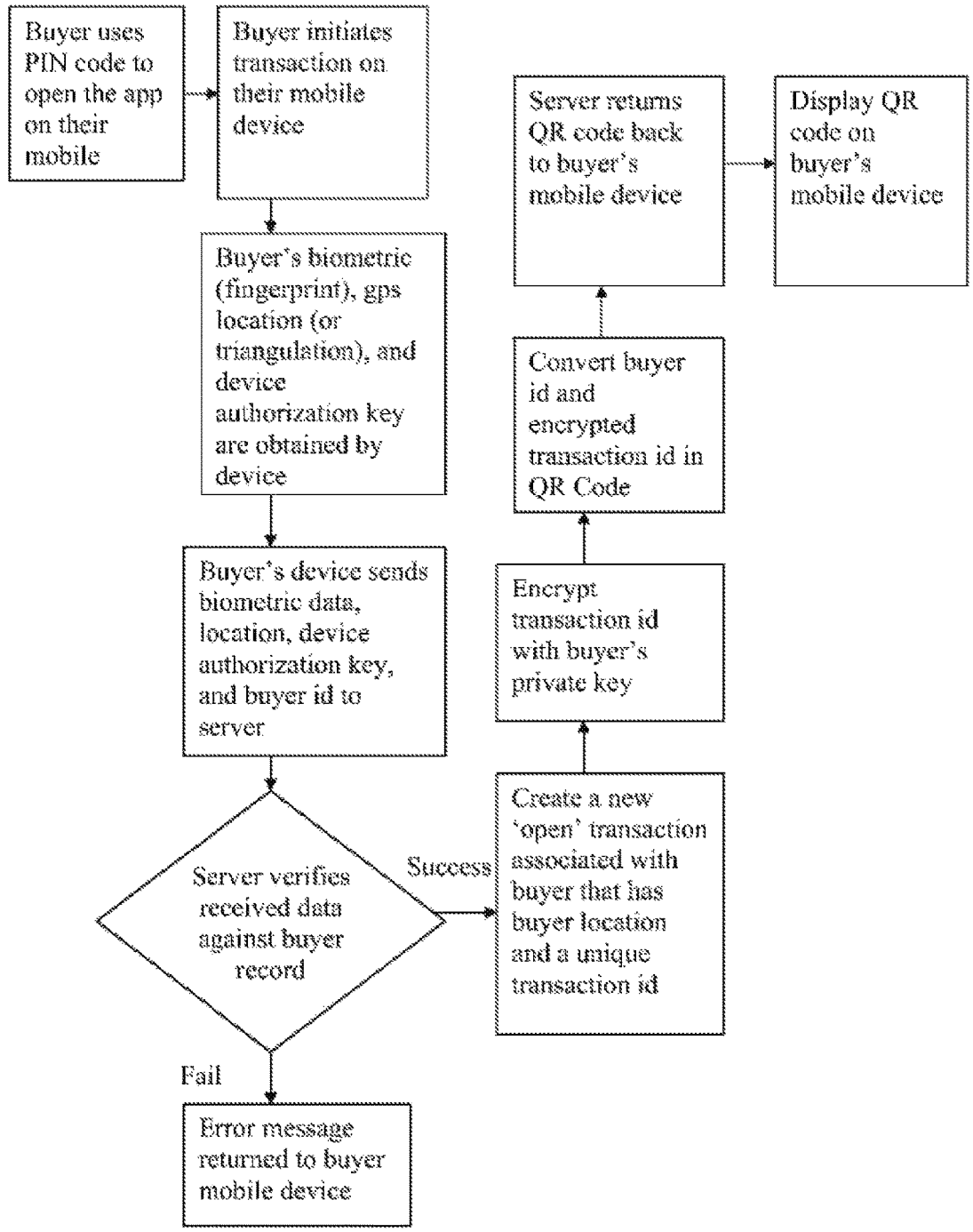
FIG. 2. Detailed Flowchart.
Figure 2:
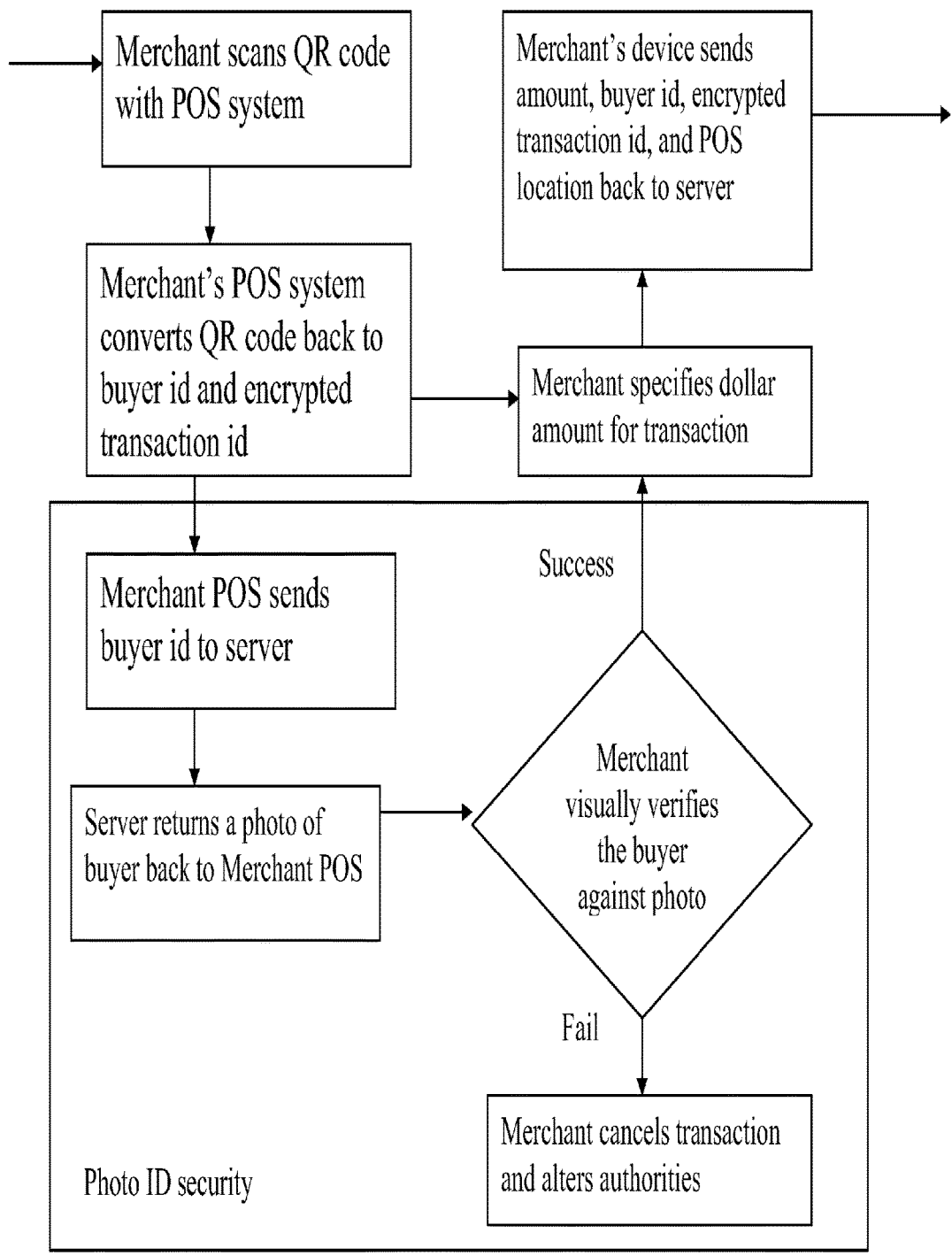
Figure 2:
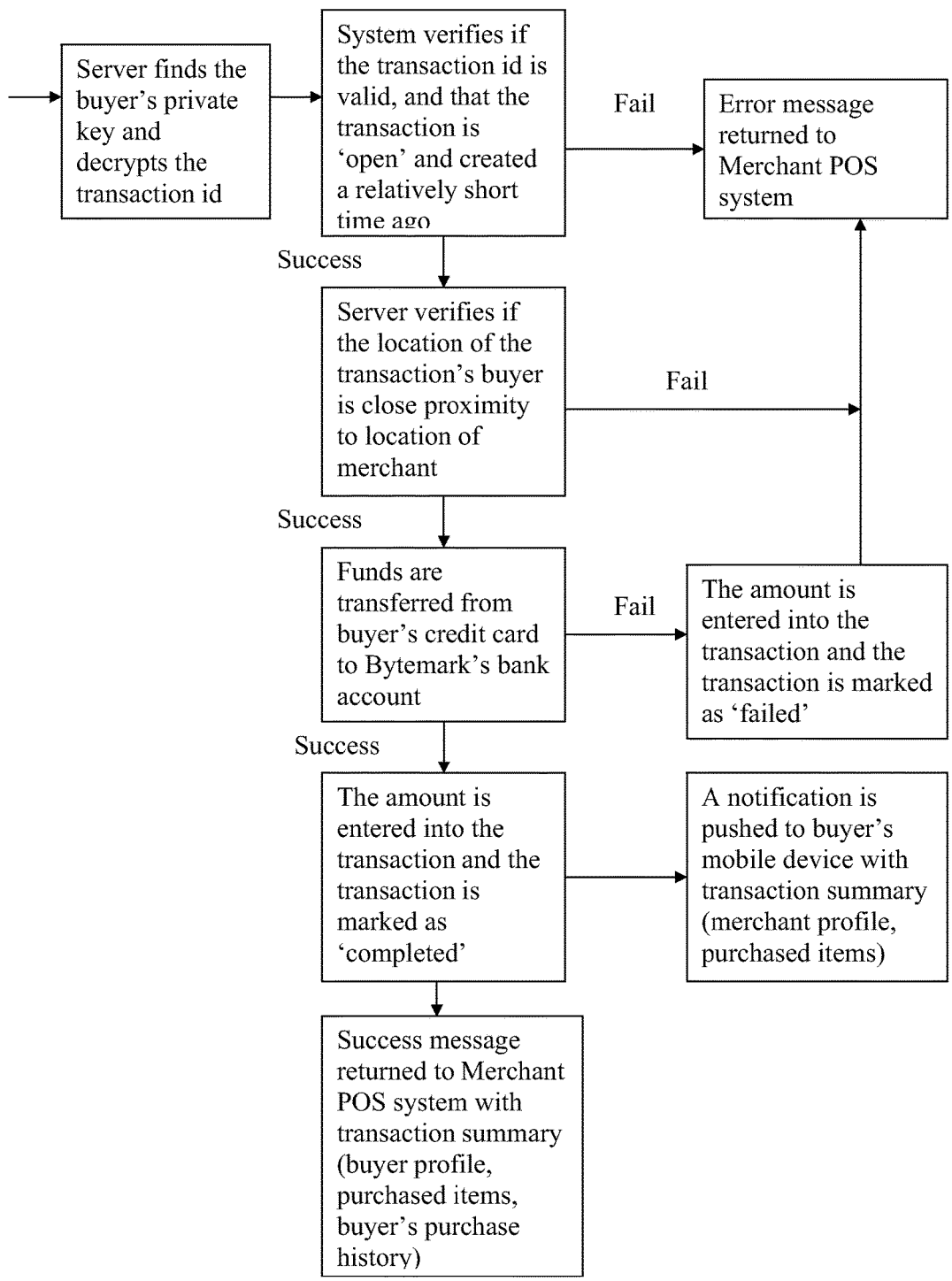
Figure 3:
FIG. 3. Mobile device screenshots.

In one embodiment, presented in FIG. 1, the steps of the method are as follows: The customer uses an application running on the Mobile Device to transmit a request for a transaction to the Transaction Service (1). The data message embodying the request contains authentication information that the Transaction server (8) uses to verify the request. Once verified, the Transaction Service transmits the data object, which in one embodiment is a digital representation of a QR code image to the Mobile Device (2). The Mobile Device displays the data object to the Merchant POS device, which scans it (3). The Merchant POS device transmits to the Transaction Service a data message embodying a verification request containing data recovered from the scanned data object and the identity of the merchant. The Transaction Service (8) verifies the verification request and transmits the payment scheme information associated with the customer, which may be a credit card number, to the payment gateway (5). When the payment gateway responds with a data message representing an approval (6), verification is confirmed by transmission of a data message to the Merchant POS (7). At that point, the merchant can rely on the payment. By means of this protocol, the customer's credit card number or other proprietary information does not have to be stored on the mobile device or transmitted at all except between the Transaction Service and the Payment Gateway. In addition, the merchant can rely on verification of payment by the Transaction Service before delivering goods or services to the customer. Information provided as part of the transaction can include gift card, coupon, personal identity, unlock codes for real or virtual locations, or other proprietary information.

The request for a transaction transmitted from the customer's mobile device in one or more data messages initiates the process. The request for transaction can contain a price, information identifying the customer and information identifying the mobile device. In one embodiment, the customer enters a user identifier and password into the application running on the mobile device. The password is included in the transaction request along with the UDID number of the cell-phone and cell-phone number. In another embodiment, biometric data is included in the transaction request. The transaction service maintains a database that associates a customer's user identifier, password, UDID number with the customer's preferred payment scheme information and biometric information. The payment scheme information can include a bank account, credit card number, PayPal™ account or other on-line payment data. This data is what is used by the payment gateway to complete the transaction. The payment gateway can include a credit card processing service, a merchant bank, an on-line payment token service, for example PayPal™ or posting the payment amount to the customer's cell-phone service provider account.

Verification of the customer can be performed by one or more techniques. In one embodiment, the customer's user identifier, password and UDID number are matched in the transaction service database. Other information that can be used to associate a mobile device with a customer's account include the device serial number, UDID, IMEI, ICCID, and Cellular Data Number, which are all data located on the phone that can be cross-referenced with the app and phone number to validate the identity of the customer in both the initial setup phase of the user and every time the user subsequently logs in or requests a transaction.

In another embodiment, the Transaction Service database associates a customer's identity and payment scheme information (which can include a credit card number) with certain biometric information. The biometric information can include a picture of the customer's face, a fingerprint or iris scan. The application running on the mobile device can take a picture of the customer or scan their fingerprint and transmit that image to the transaction service, along with the customer's user-id and password. The database at the transaction service can be queried to match the biometric data to the customer's purported identity. The stored picture of the customer's face or fingerprint can be matched against the transmitted images using typical heuristic algorithms known in the field. If there is a sufficient match of the biometric data to the customer's identity, the request for transaction is verified.

In another embodiment, the received transaction request is associated with a time stamp. The customer can set up their account with the transaction service provider to have a transaction expire upon a predetermined period of time after the time stamp, for example, 10 minutes. In another embodiment, the transaction verification is completed when the merchant transmits a request for verification. In that embodiment, the customer's request for a transaction contains location data derived from the mobile device, using GPS, cellular tower triangulation or WiFi assisted location detection or any other locating technique. The Merchant POS system transmits a verification request also containing the merchant's location. The two locations are compared to ensure that the customer's request is occurring at or sufficiently near the location of the merchant.

Once the transaction request is verified by the Transaction Service, the Transaction Service server generates a data object that is transmitted back to the mobile device. In the preferred embodiment, this will be a QR code. The QR code will contain an alpha-numerical value associated with the Transaction Server with the pending requested transaction. The application running on the Mobile Device will display the data object on the screen of the device. This is presented by the customer to the merchant. The Merchant Point of Sale (POS) device scans the QR code in order to capture the alpha-numeric data embedded within it. In one embodiment, the QR code contains a picture of the customer that originated from the Transaction Service database. The merchant can view the image to verify the identity of the customer. In another embodiment, the alpha-numeric code is embedded by the Merchant POS device into a data message embodying a verification request that is transmitted to the Transaction Service. In that embodiment, the transaction service recovers the customer's image from its database and transmits it to the Merchant POS for display. The merchant's verification request data message includes the identity information of the merchant, the price to be charged and the type goods or services. The transaction service can then verify with the payment gateway that the transaction can be completed. In one embodiment, the transaction service requests that the payment gateway execute the payment. In yet another embodiment, the transaction service checks that the merchant's request for verification matches with the customer's request for a transaction. This can be accomplished by using the alpha-numeric value derived from the scanned data object to query the database containing pending transactions. Each pending transaction will be associated with a data record comprised of a unique alpha-numeric value. After the merchant verification request is completed, the verification confirmation is transmitted to the Merchant POS.

Once transaction is complete, the transaction service can send a data message representing a notice to the customer's mobile device that contains the details of the transaction or a hyper-link to a location that will cause the display of such detail.

In one embodiment, the Merchant POS device has to activate a connection with the transaction service by transmitting the merchant's user-id and password for verification by the transaction service. In much the same way as with verifying the mobile device of the customer, the Merchant POS device is also verified. In another embodiment, the merchant can display an image, including one printed on a piece of paper, that the customer can take a picture of. This image can be included with the customer's transaction request. The pending transaction request can then be associated with an identifying number derived from the image, which is also associated with the merchant's user-id. When the merchant requests verification, the transaction service also verifies that the merchant's user-id is associated with the identifying number captured and transmitted by the customer. This ensures for the customer that the correct merchant is getting verification of payment.

The customer causes the installation of the application on the customer's mobile device. This is accomplished by downloading an install package from the transaction service or other software provider. When the install is occurring, the install package detects the UDID data value of the mobile device and transmits that to the transaction service. The customer is then prompted to create a user-id, password and to provide payment scheme details, which can include a credit card number. In another embodiment, the payment scheme information can be provided to the transaction service separately, for example, from another computer so that the sensitive information is never presented to the mobile device. The mobile device can be used to take and transmit a picture of the customer. The transaction service can use social networking tools to verify the customer's picture. Alternatively a fingerprint scan or iris scan may be used.

In yet another embodiment, the system and method can be used with digital coupons, rewards cards or gift cards. A digital coupon, reward card or gift card can simply be a set of data that represents the same thing as a printed discount coupon, reward card or gift card: some price reduction offered by a merchant, possibly for a specific product or service. Once used, the coupon or card is useless. Examples of coupons and gift cards delivered by electronic means, or example, by email or coupons that are downloaded from a website are known in the art. These digital coupons or cards may be captured and stored by the Mobile Device. In this embodiment, a customer's request for a transaction can include a reference to or the actual digital coupon or card data. In that case, the verification of the transaction will be for the price of the transaction minus the amount of the discount represented by the digital coupon or card. Reference to the coupon or card can be included in the data payload embodied by the data object transmitted to the customer's mobile device. In this embodiment, the Merchant POS makes a request for the transaction service server to verify both the coupon or card and the transaction authorization. When verified, the payment is processed minus the discount represented by the coupon or card. When the transaction is complete, the Merchant POS transmits to the Transaction Service a transaction record that includes the discount represented by the digital coupon. The Transaction Service server can then verify that the coupon or card was applied to the transaction. If so, the coupon or card value is reduced or the coupon or card invalidated for having been used.

Practitioners of ordinary skill will recognize that the execution of payment by the payment gateway can be initiated either upon the request for transaction by the customer, upon the verification request of the Merchant POS, or after the transaction service verifies that the transaction was completed.

In another embodiment, if the data object being scanned is no longer valid for whatever reason, the mobile device is redirected to the transaction service website.

In another embodiment, the data object is not an image displayed on the mobile device. Rather, it is a set of data that is locally transmitted from the mobile device to the Merchant POS. Such direct communication can be by means of local wireless data network, for example WiFi or WiMax or using short range transmission like UWB, NFC, or Bluetooth Other uses of the system and method are applied to fields distinct from retail transactions with merchants. The Merchant POS can instead be a computer system that is requesting verification that a person presenting themselves as a particular identity is in fact that person. In this way, the system and method may be used to verify membership of an organization either real or virtual, or gain entry into a location either real or virtual. Applications include actuating keyless entry using data object for real or virtual. In that embodiment, the computer requesting verification uses the data object it has retrieved to formulate a verification request. If the verification is made by the transaction service, the computer actuates a solenoid to unlock the door. In this case, the transaction service data base contains data in the data records that are an authorization code associated with the point of entry. The biometric data recovered by the requesting computer, including a picture of a face can be matched with the biometric data stored on the server. Similarly, the application can include using the device to authorize pre-paid entry into a mass transit system that verifies the identity of the user and provides access to the bus, train, or subway system. In another application, membership for gyms or clubs would be verified and biometric data would be cross-referenced by the transaction server to verify membership and permit entry.

Another embodiment uses the system to control access to websites. In this embodiment, a website server retrieves the data object from the mobile device and requests that the transaction service server check that the location of the laptop/desktop attempting to log into the secure website is the same location as the location of the mobile device associated with the same person that is associated with the laptop/desktop.

In another embodiment, the Merchant POS is in fact the point of delivery of health care. In this case, proprietary insurance information is maintained by the transaction service server. Identification would create a QR Code or similar secure 2D or 3D data object associated with a person's identifying documents like driver's license, birth certificate, or social security card. This would encrypt the information and only allow for the data to be retrieved by an authorized recipient. At the point of health service delivery, where this information is needed, the patient will request a transaction and the verification process used to verify the health care provider before the data is disclosed. In yet another embodiment, the health care provider is able to verify that the patient is covered for the services to be provided without having access to proprietary information. Instead the transaction service interacts with the insurance company for verification, and as trusted third party, delivers a verification to the health care provider.

The system is typically comprised of a central server that is connected by a data network to a user's computer. The central server may be comprised of one or more computers connected to one or more mass storage devices. The precise architecture of the central server does not limit the claimed invention. In addition, the data network may operate with several levels, such that the user's computer is connected through a fire wall to one server, which routes communications to another server that executes the disclosed methods. The precise details of the data network architecture does not limit the claimed invention. Further, the user's computer may be a laptop or desktop type of personal computer. It can also be a cell phone, smart phone or other handheld device. The precise form factor of the user's computer does not limit the claimed invention. In one embodiment, the user's computer is omitted, and instead a separate computing functionality provided that works with the central server. This may be housed in the central server or operatively connected to it. In this case, an operator can take a telephone call from a customer and input into the computing system the customer's data in accordance with the disclosed system and method. Further, the customer may receive from and transmit data to the central server by means of the Internet, whereby the customer accesses an account using an Internet web-browser and browser displays an interactive web page operatively connected to the central server. The central server transmits and receives data in response to data and commands transmitted from the browser in response to the customer's actuation of the browser user interface.

A server may be a computer comprised of a central processing unit with a mass storage device and a network connection. In addition a server can include multiple of such computers connected together with a data network or other data transfer connection, or, multiple computers on a network with network accessed storage, in a manner that provides such functionality as a group. Practitioners of ordinary skill will recognize that functions that are accomplished on one server may be partitioned and accomplished on multiple servers that are operatively connected by a computer network by means of appropriate inter process communication. In addition, the access of the website can be by means of an Internet browser accessing a secure or public page or by means of a client program running on a local computer that is connected over a computer network to the server. A data message and data upload or download can be delivered over the Internet using typical protocols, including TCP/IP, HTTP, SMTP, RPC, FTP or other kinds of data communication protocols that permit processes running on two remote computers to exchange information by means of digital network communication. As a result a data message can be a data packet transmitted from or received by a computer containing a destination network address, a destination process or application identifier, and data values that can be parsed at the destination computer located at the destination network address by the destination application in order that the relevant data values are extracted and used by the destination application.

It should be noted that the flow diagrams are used herein to demonstrate various aspects of the invention, and should not be construed to limit the present invention to any particular logic flow or logic implementation. The described logic may be partitioned into different logic blocks (e.g., programs, modules, functions, or subroutines) without changing the overall results or otherwise departing from the true scope of the invention. Oftentimes, logic elements may be added, modified, omitted, performed in a different order, or implemented using different logic constructs (e.g., logic gates, looping primitives, conditional logic, and other logic constructs) without changing the overall results or otherwise departing from the true scope of the invention.

The method described herein can be executed on a computer system, generally comprised of a central processing unit (CPU) that is operatively connected to a memory device, data input and output circuitry (IO) and computer data network communication circuitry. Computer code executed by the CPU can take data received by the data communication circuitry and store it in the memory device. In addition, the CPU can take data from the I/O circuitry and store it in the memory device. Further, the CPU can take data from a memory device and output it through the IO circuitry or the data communication circuitry. The data stored in memory may be further recalled from the memory device, further processed or modified by the CPU in the manner described herein and restored in the same memory device or a different memory device operatively connected to the CPU including by means of the data network circuitry. The memory device can be any kind of data storage circuit or magnetic storage or optical device, including a hard disk, optical disk or solid state memory.

Examples of well known computing systems, environments, and/or configurations that may be suitable for use with the invention include, but are not limited to, personal computers, server computers, hand-held, laptop or mobile computer or communications devices such as cell phones and PDA's, multiprocessor systems, microprocessor-based systems, set top boxes, programmable consumer electronics, network PCs, minicomputers, mainframe computers, distributed computing environments that include any of the above systems or devices, and the like.

Computer program logic implementing all or part of the functionality previously described herein may be embodied in various forms, including, but in no way limited to, a source code form, a computer executable form, and various intermediate forms (e.g., forms generated by an assembler, compiler, linker, or locator.) Source code may include a series of computer program instructions implemented in any of various programming languages (e.g., an object code, an assembly language, or a high-level language such as FORTRAN, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The invention may be described in the general context of computer-executable instructions, such as program modules, being executed by a computer. Generally, program modules include routines, programs, objects, components, data structures, etc., that perform particular tasks or implement particular abstract data types. The computer program and data may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed hard disk), an optical memory device (e.g., a CD-ROM or DVD), a PC card (e.g., PCMCIA card), or other memory device. The computer program and data may be fixed in any form in a signal that is transmittable to a computer using any of various communication technologies, including, but in no way limited to, analog technologies, digital technologies, optical technologies, wireless technologies, networking technologies, and internetworking technologies. The computer program and data may be distributed in any form as a removable storage medium with accompanying printed or electronic documentation (e.g., shrink wrapped software or a magnetic tape), preloaded with a computer system (e.g., on system ROM or fixed disk), or distributed from a server or electronic bulletin board over the communication system (e.g., the Internet or World Wide Web.)

The invention may also be practiced in distributed computing environments where tasks are performed by remote processing devices that are linked through a communications network. In a distributed computing environment, program modules may be located in both local and remote computer storage media including memory storage devices. Practitioners of ordinary skill will recognize that the invention may be executed on one or more computer processors that are linked using a data network, including, for example, the Internet. In another embodiment, different steps of the process can be executed by one or more computers and storage devices geographically separated by connected by a data network in a manner so that they operate together to execute the process steps. In one embodiment, a user's computer can run an application that causes the user's computer to transmit a stream of one or more data packets across a data network to a second computer, referred to here as a server. The server, in turn, may be connected to one or more mass data storage devices where the database is stored. The server can execute a program that receives the transmitted packet and interpret the transmitted data packets in order to extract database query information. The server can then execute the remaining steps of the invention by means of accessing the mass storage devices to derive the desired result of the query. Alternatively, the server can transmit the query information to another computer that is connected to the mass storage devices, and that computer can execute the invention to derive the desired result. The result can then be transmitted back to the user's computer by means of another stream of one or more data packets appropriately addressed to the user's computer.

The described embodiments of the invention are intended to be exemplary and numerous variations and modifications will be apparent to those skilled in the art. All such variations and modifications are intended to be within the scope of the present invention as defined in the appended claims. Although the present invention has been described and illustrated in detail, it is to be clearly understood that the same is by way of illustration and example only, and is not to be taken by way of limitation. It is appreciated that various features of the invention which are, for clarity, described in the context of separate embodiments may also be provided in combination in a single embodiment. Conversely, various features of the invention which are, for brevity, described in the context of a single embodiment may also be provided separately or in any suitable combination. It is appreciated that the particular embodiment described in the Appendices is intended only to provide an extremely detailed disclosure of the present invention and is not intended to be limiting. It is appreciated that any of the software components of the present invention may, if desired, be implemented in ROM (read-only memory) form. The software components may, generally, be implemented in hardware, if desired, using conventional techniques.

The foregoing description discloses only exemplary embodiments of the invention. Modifications of the above disclosed apparatus and methods which fall within the scope of the invention will be readily apparent to those of ordinary skill in the art. Accordingly, while the present invention has been disclosed in connection with exemplary embodiments thereof, it should be understood that other embodiments may fall within the spirit and scope of the invention, as defined by the following claims.

What is claimed:

1. A system for electronically executing a purchase transaction by a user comprising:
    A remote mobile device comprised of a display screen;
    A transaction server adapted to receive from the remote mobile device a first request to initiate the purchase transaction, said transaction server further adapted to verify that the first transaction initiation request received from the mobile device is authorized and in dependence on such verification transmit to the remote mobile device a data object associated with the initiated transaction, wherein the data object includes at least one of a bar code or QR code; where the remote mobile device is operatively connected to the transaction server using a data network, said remote mobile device adapted to receive the data object and to display the data object on its display screen as an image and said transaction server being operatively connected to a database having a data record associated with the first request and the data object;
    A second device located at a point of sale operatively connected to the transaction server using a data network, said second device being adapted to detect the data object displayed by the remote mobile device to provide a detected data object and further adapted to transmit to the transaction server a second request to verify the initiated transaction, said second request being comprised of data derived from the detected data object and biometric data, and the transaction server being further adapted to receive the second request to verify the initiated transaction referenced by the received second request by using data extracted from the received second request to provide a verified transaction and to allow the verified transaction to be executed.

2. The system of claim 1, where the biometric data is one of a picture of a face, a fingerprint scan, an iris scan, a picture of an eyeball.

3. The system of claim 1, where the system is further adapted to retrieve from the database an image associated with the remote mobile device and transmit the image to the second device located at the point of sale in order to cause the second device to display the image.

4. The system of claim 1, where the system is further adapted to verify the transaction by querying the database for a data record associated with the pending transaction using an alpha-numeric data value derived from the detected data object.

5. The system of claim 1, further comprising a payment gateway adapted to receive a payment detail, where the payment gateway is a cell phone service provider server adapted to receive the payment detail, said payment detail comprised of identifying information associated with a user's customer account and an amount of money to be posted as a charge to the user's account, said user being associated with the remote mobile device.

6. The system of claim 1, where the second transaction request is comprised of a time stamp where the transaction server is further adapted to not complete the transaction if the time stamp is older than a predetermined amount of time.

7. The system of claim 1, where the transaction request is comprised of location data derived from data received from the remote mobile device and the transaction server is further adapted to permit the verification of the transaction if the derived location data indicates proximity to the device located at the point of sale.

8. The system of claim 1, where the transaction server is further adapted to transmit to the remote mobile device a data message representing details of the transaction or a hyper-link to a location that will cause the display of such detail.

9. The system of claim 1, where the database is further comprised of a data record associated with the user, said data record comprised of a UDID data value of a device, a user-id, a password and payment scheme details.

10. The system of claim 1, further comprising a payment gateway adapted to receive a payment scheme detail, where the payment scheme detail is comprised of a credit card number.

11. The method of claim 1, where the transaction server is further adapted to transmit to the second device a digital coupon associated with the first transaction request and the point of sale device is further adapted to verify the digital coupon and reduce the amount being charged in the transaction by the amount determined by the digital coupon.

12. The system of claim 1, where the database is adapted to maintain a user's insurance information as part of a data record for verification of the user as an authorized patient by transmitting a bar code or QR Code associated with the user to the remote mobile device, said user being associated with the remote device.

13. The system of claim 1, where the second request is comprised of data representing an identifier associated with the second device and the transaction server is further adapted to verify the authenticity of the second device.

14. A system for electronically executing a purchase transaction by a user comprising:
    A remote mobile device comprised of a display screen;
    A transaction server adapted to receive from the remote mobile device a first request to initiate the purchase transaction, said transaction server further adapted to verify that the first transaction initiation request is authorized and in dependence on such verification transmit to the remote mobile device a data object associated with the initiated transaction that is comprised of a QR code; where the remote mobile device is operatively connected to the transaction server using a data network, said remote mobile device further adapted to receive the data object and to display the data object on its display screen;
    A second device located at a point of sale operatively connected to the transaction server using a data network, said second device adapted to detect the displayed data object displayed by the remote mobile device to provide a detected data object and further adapted to transmit to the transaction server a second request to verify the initiated transaction, said second request being comprised of data derived from the detected data object and biometric data, and the transaction server being further adapted to receive the second request to verify the initiated transaction referenced by the received second request to provide a verified transaction and to allow the verified transaction to be executed.

15. A system for electronically executing a purchase transaction by a user comprising:
A remote mobile device comprised of a display screen;
A transaction server adapted to receive from the remote mobile device a first request to initiate the purchase transaction, said transaction server further adapted to verify that the first transaction initiation request is authorized and in dependence on such verification transmit to the remote mobile device a data object associated with the initiated transaction, wherein the data object includes at least one of a bar code or QR code, where the remote mobile device is operatively connected to the transaction server using a data network, said remote mobile device further adapted to receive the data object and to display the data object on its display screen;
A second device located at a point of sale operatively connected to the transaction server using a data network, said second device adapted to detect the displayed data object displayed by the remote mobile device to provide a detected data object and further adapted to transmit to the transaction server a second request to verify the initiated transaction, said second request being comprised of data derived from the detected data object and biometric data, and the transaction server being further adapted to receive the second request to verify the initiated transaction referenced by the received second request, said transaction server being further adapted to retrieve from a database an image associated with the remote mobile device and to transmit the retrieved image to the second device.

16. A system for electronically authorizing a patient, said system comprising:
A remote mobile device comprised of a display screen;
A transaction server adapted to receive from the remote mobile device a first request to initiate the purchase transaction, said transaction server further adapted to verify that the first transaction initiation request is authorized and in dependence on such verification transmit to the remote mobile device a data object associated with the initiated transaction, wherein the data object is a bar code or QR code, where the remote mobile device is operatively connected to the transaction server using a data network, said remote mobile device further adapted to receive the data object and to display the data object on its display screen;
A second device operatively connected to the transaction server using a data network, said second device adapted to detect the displayed data object displayed by the remote mobile device to provide a detected data object and further adapted to transmit to the transaction server a second request to verify the initiated transaction, said second request being comprised of data derived from the detected data object and biometric data, and the transaction server being further adapted to receive the second request to verify the initiated transaction referenced by the received second request whereby the transaction server is connected by a data network to a database adapted to store insurance information in a data record associated with a user of the mobile device so that the transaction server transmits as the data object a QR code in order that the second device can verify that the user of the mobile device is an authorized patient.

17. A system for electronically executing a purchase transaction by a user comprising:
A remote mobile device comprised of a display screen;
A transaction server adapted to receive from the remote mobile device a first request to initiate the purchase transaction, said transaction server further adapted to verify that the first transaction initiation request received from the mobile device is authorized and in dependence on such verification transmit to the remote mobile device permission to release a data object associated with the initiated transaction, wherein the data object includes at least one of a bar code or QR code; where the remote mobile device is operatively connected to the transaction server using a data network and said remote mobile device is adapted to display the data object on its display screen as an image and said transaction server is operatively connected to a database having a data record associated with the first request and the data object;
A second device located at a point of sale operatively connected to the transaction server using a data network, said second device being adapted to detect the data object displayed by the remote mobile device to provide a detected data object and further adapted to transmit to the transaction server a second request to verify the initiated transaction, said second request being comprised of data derived from the detected data object and biometric data, and the transaction server being further adapted to receive the second request to verify the initiated transaction referenced by the received second request by using data extracted from the received second request to provide a verified transaction and to allow the verified transaction to be executed.

18. A system for electronically executing a purchase transaction by a user comprising:
A remote mobile device comprised of a display screen;
a transaction server adapted to receive from the remote mobile device a first request to initiate the purchase transaction, said transaction server further adapted to verify that the first transaction initiation request received from the mobile device is authorized and in dependence on such verification transmit to the remote mobile device a data object associated with the initiated transaction, wherein the data object includes at least one of a bar code or QR code; where the remote mobile device is operatively connected to the transaction server using a data network, said remote mobile device adapted to receive the data object and to display the data object on its display screen and said transaction server being operatively connected to a database having a data record associated with the first request and the data object;
A second device located at a point of sale operatively connected to the transaction server using a data network, said second device being adapted to detect the data object displayed by the remote mobile device to provide a detected data object and further adapted to transmit to the transaction server a second request to verify the initiated transaction, said second request being comprised of data derived from the detected data object and data representing an identifier associated with the second device and the transaction server is further adapted to verify the authenticity of the second device, and the transaction server being further adapted to receive the second request to verify the initiated transaction referenced by the received second request by using data extracted from the received second request to provide a verified transaction and to allow the verified transaction to be executed.

19. The system of claim 18, where the system is further adapted to retrieve from the database an image associated with the remote mobile device and transmit the image to the second device located at the point of sale in order to cause the second device to display the image.

20. The system of claim 18, where the system is further adapted to verify the transaction by querying the database for a data record associated with the pending transaction using an alpha-numeric data value derived from the detected data object.

21. The system of claim 18, further comprising a payment gateway adapted to receive a payment detail, where the payment gateway is a cell phone service provider server adapted to receive the payment detail, said payment detail comprised of identifying information associated with a user's customer account and an amount of money to be posted as a charge to the user's account, said user being associated with the remote mobile device.

22. The system of claim 18, where the second transaction request is comprised of a time stamp where the transaction server is further adapted to not complete the transaction if the time stamp is older than a predetermined amount of time.

23. The system of claim 18, where the transaction request is comprised of location data derived from data received from the remote mobile device and the transaction server is further adapted to permit the verification of the transaction if the derived location data indicates proximity to the device located at the point of sale.

24. The system of claim 18, where the transaction server is further adapted to transmit to the remote mobile device a data message representing details of the transaction or a hyper-link to a location that will cause the display of such detail.

25. The system of claim 18, where the database is further comprised of a data record associated with the user, said data record comprised of a UDID data value of a device, a user-id, a password and payment scheme details.

26. The system of claim 18, further comprising a payment gateway adapted to receive a payment scheme detail, where the payment scheme detail is comprised of a credit card number.

27. The method of claim 18, where the transaction server is further adapted to transmit to the second device a digital coupon associated with the first transaction request and the second device is further adapted to verify the digital coupon and reduce the amount being charged in the transaction by the amount determined by the digital coupon.

28. The system of claim 18, where the database is adapted to maintain a user's insurance information as part of a data record for verification of the user as an authorized patient by transmitting a QR Code associated with the user to the remote mobile device, said user being associated with the remote device.

29. The system of claim 18, where the second request is comprised of data representing an identifier associated with the second device and the transaction server is further adapted to verify the authenticity of the second device.

* * * * *